US012614116B2

(12) United States Patent
Young, Jr. et al.

(10) Patent No.: US 12,614,116 B2
(45) Date of Patent: Apr. 28, 2026

(54) MACHINE LEARNING-BASED SYNTHETIC MONITORING

(71) Applicant: Capital One Services, LLC, McLean, VA (US)

(72) Inventors: Michael Anthony Young, Jr., Henrico, VA (US); Matthew Louis Nowak, Midlothian, VA (US); Christopher McDaniel, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 547 days.

(21) Appl. No.: 18/215,391

(22) Filed: Jun. 28, 2023

(65) Prior Publication Data

US 2025/0005428 A1 Jan. 2, 2025

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

| | | | | |
|---|---|---|---|---|
| 11,354,440 B1 * | 6/2022 | Sanchez | .............. | G06F 11/3636 |
| 11,562,298 B1 * | 1/2023 | Bayandin | ............... | G06N 20/00 |
| 11,611,497 B1 * | 3/2023 | Manikanta | .............. | H04L 67/02 |
| 2012/0239986 A1 * | 9/2012 | Kraus | ................. | G06F 11/3688 |
| | | | | 714/49 |
| 2023/0058609 A1 * | 2/2023 | Herren | .................. | G06F 11/302 |
| 2023/0087837 A1 * | 3/2023 | Hwang | ................. | G06N 3/048 |
| | | | | 706/12 |

OTHER PUBLICATIONS

ALERTBOT webpage, The All-in-one Platform, Advanced Monitoring Simplified, date of publication unknown but, prior to Jun. 28, 2023, 8 pages.
Webpage, Monitor Websites, Web Applications, & APIs in Real-Time, <<https://www.dotcom-monitor.com/>>, date of publication unknown but, prior to Jun. 28, 2023, 13 pages.
Sadowski, Ebook, "Application-wide auto-detection of issues without user setup," date of publication unknown but, prior to Jun. 28, 2023, 10 pages.
Aug. 27, 2020—Noaa at Netreo, "Managing Digital Experience Using Synthetic Monitoring," 4 pages.

* cited by examiner

*Primary Examiner* — Mohammad A Siddiqi
(74) *Attorney, Agent, or Firm* — Banner & Witcoff, Ltd.

(57) ABSTRACT

Methods, systems, and apparatuses are described herein for using machine learning processes to improve synthetic monitoring of, e.g., websites. Training data may comprise sitemap information for a plurality of different websites and monitoring information that indicates whether, for each of a plurality of different portions of those websites, one or more synthetic monitoring scripts are executed. A machine learning model may be trained using that training data to output whether one or more portions of an input website should be monitored using synthetic monitoring. A sitemap of a first website may be determined and provided as input to the trained first machine learning model. Based on output from the trained first machine learning model, a synthetic monitoring script may be determined and executed to monitor at least a first portion of the first website.

20 Claims, 6 Drawing Sheets

Network Resource Data
(e.g., Website Sitemap)
(401)

First Machine Learning Model
(402)

Indications of Portion(s) of
Network Resource to Monitor
(403)

Second Machine Learning Model
(404)

Scripts to Monitor Portion(s) of
Network Resource
(405)

Executing Applications
(e.g., Web Browser in Virtual Machine)
(406)

```
ACCESS loginpage.html
GO TO input name="username"
ENTER testingusername123
GO TO input type="password"
ENTER testingpassword123
CLICK input type="button"
ALERT IF NOT HTTP 200
```

Synthetic Monitoring Script
(600)

FIG. 6

MACHINE LEARNING-BASED SYNTHETIC MONITORING

FIELD OF USE

Aspects of the disclosure relate generally to the computer-implemented monitoring of network resources, such as websites. More specifically, aspects of the disclosure may provide for improvements to synthetic monitoring by using machine learning to process existing synthetic monitoring approaches and to output indications of where synthetic monitoring scripts should be executed with respect to a particular website.

BACKGROUND

Network resources, such as websites, may be periodically monitored to ensure functionality. For example, an administrator of a website may periodically access one or more pages of a website to ensure that the website is accessible to users. Given the complexity of modern network resources, administrators are increasingly using synthetic monitoring to perform such monitoring. Synthetic monitoring entails use of scripts that, when executed, perform steps that perform monitoring steps on behalf of an administrator. For example, an administrator might use a synthetic monitoring script executing in a web browser to periodically confirm that a particular web page is accessible, and/or to confirm that a user login functionality on a website is functional.

One issue with synthetic monitoring is that establishing an appropriate synthetic monitoring strategy can be time-consuming and error-prone. Administrators generally do not have the time or desire to manually program the code required to accurately and efficiently synthetically monitor their websites. Moreover, for websites with hundreds (if not thousands or millions) of pages, accurately synthetically testing each and every page might be computationally wasteful and time-consuming.

Aspects described herein may address these and other problems, and generally improve the process of synthetic monitoring by using a trained machine learning model to provide output that can be used to implement synthetic monitoring with respect to a particular website.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to use of machine learning models to improve synthetic monitoring of network resources, such as websites. A first machine learning model might be trained based on information about a plurality of different websites. For example, the first machine learning model might be trained using information about how a plurality of different websites are monitored using synthetic monitoring scripts. Such information might specify, for instance, that login pages and front pages of those websites are monitored using synthetic monitoring scripts, but some other pages are not monitored using synthetic monitoring scripts. An indication of a first website (e.g., a Uniform Resource Locator (URL) of the first website) might then be received. That first website might be crawled using a web crawler to determine a sitemap of the first website. The sitemap might then be provided to the trained first machine learning model, which may output one or more recommendations regarding where synthetic monitoring scripts should be executed with respect to the first website. A second machine learning model may have been trained to output synthetic monitoring scripts in response to input indicating one or more portions of a website. In turn, the output from the first machine learning model may be provided to the second machine learning model, prompting the second machine learning model to output scripts for use in synthetically monitoring the first website. Those scripts may be then be executed, causing synthetic monitoring of some or all of the first website. As such, aspects described herein may take a simple indication of a website (e.g., a URL of a first website) and, via two machine learning models, output specific synthetic monitoring scripts that can be executed to monitor key aspects of the website.

More particularly, a computing device may be configured to receive training data comprising: sitemap information indicating different portions of a plurality of different websites: and monitoring information indicating whether, for each of the different portions of the plurality of different websites, one or more synthetic monitoring scripts are executed. The one or more synthetic monitoring scripts may comprise code that, when executed by a web browser application, cause automatic monitoring of at least a portion of a website. The computing device may train, based on the training data, a first machine learning model comprising a plurality of nodes to output whether one or more portions of an input website should be monitored using synthetic monitoring. The computing device may receive an indication of a first website. The computing device may then determine input data comprising a sitemap of the first website. For example, the computing device may cause execution of a web crawler script that generates the sitemap of the first website. The computing device may provide, as input to the trained first machine learning model, the input data. The computing device may receive, as output from the trained first machine learning model, output data comprising an indication of one or more portions of the first website. The computing device may determine second training data comprising code from one or more synthetic monitoring scripts executed with respect to one or more of the different portions of the plurality of different websites. The computing device may train, based on the second training data, a second machine learning model comprising a second plurality of nodes to output synthetic monitoring scripts in response to input indicating one or more portions of a website. The computing device may determine, based on the one or more portions of the first website, a first synthetic monitoring script for monitoring at least one of the one or more portions of the first website by: providing, as input to the trained second machine learning model, the output data: and receiving, as output from the trained second machine learning model, second output data comprising an indication of the first synthetic monitoring script. That output might indicate one or more portions of the website where synthetic monitoring should be performed and/or one or more portions of the first website where synthetic monitoring should not be performed. That first synthetic monitoring script may comprise code that, when executed by a web browser application, causes one or more of: access to one or more URLs, or entry of data into a web form. The computing device may then cause, based on the output data, execution of the first synthetic monitoring script. For example, the computing device may send, to a virtual machine executing on a server, the first synthetic monitoring script, such that a web browser application executing in the virtual machine is configured to execute the first synthetic monitoring script.

As part of training the second machine learning model, scripts executing on a variety of different network resources may be analyzed. For example, the computing device may determine the second training data by retrieving, from a plurality of different synthetic monitoring services, a plurality of different scripts executed with respect to the one or more of the different portions of the plurality of different websites. Those scrips might be filtered based on a website type of the first website. For example, the scripts executing with respect to a banking website might be different than those executing with respect to a gaming website.

More broadly, the training data used for either the first machine learning model or the second machine learning model may be filtered based on a type of network resource. For example, the computing device may determine a website type of the first website and then filter the training data based on the type of the first website. This allows both machine learning models to adapt to the different particularities of different network resources, such that it does not inadvertently provide a one-size-fits-all approach to synthetic monitoring.

User input may be used to affect the training of either machine learning model. For example, the computing device may determine the first synthetic monitoring script by providing a user interface comprising an indication of the at least one of the one or more portions of the first website and a plurality of options that each correspond to a different synthetic monitoring script. The computing device may receive, via the user interface, user input indicating a selection of one of the plurality of options that corresponds to the first synthetic monitoring script. Then, the computing device may re-train, based on the user input indicating the selection of the one of the plurality of options, the trained first machine learning model. As another example, the computing device may, based on determining that a user deleted the first synthetic monitoring script, re-train the trained first machine learning model.

Corresponding method, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts an example of a synthetic monitoring script.

DETAILED DESCRIPTION

Figure 1:
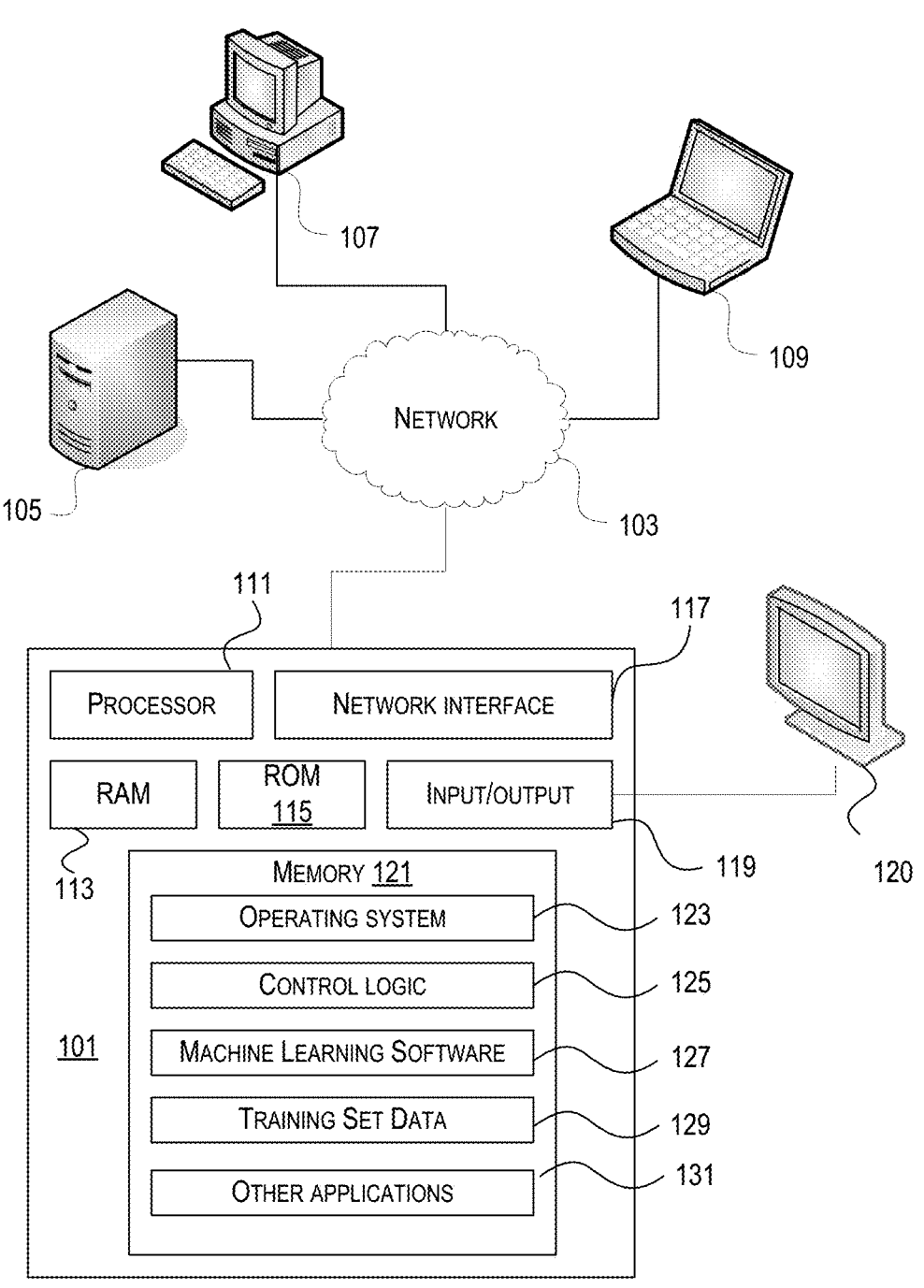
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, monitoring network resources, such as websites, can be extremely time-consuming. On one hand, manual monitoring (e.g., having a company employee check network resource functionality on a periodic basis) can be extremely time-consuming and expensive, if not extremely boring. On the other hand, synthetic monitoring (e.g., using a computing device to automatically check portions of a network resource) can take significant time to set-up, and such approaches can often miss critical failures if not configured properly. Aspects described herein improve the process of synthetic monitoring by using machine learning techniques to identify where particular websites should be monitored and by using machine learning techniques to generate scripts for monitoring those identified portions of those particular websites. This process is achieved by training machine learning models based on how synthetic monitoring is performed with respect to other websites, in effect leveraging the intense efforts to synthetically monitor other websites to learn how to synthetically monitor new (and, e.g., yet-to-be-monitored) websites. These machine learning models might learn over time, such as by learning how users configure the synthetic monitoring of websites over time, thereby improving the accuracy of the machine learning models overall.

As an example of how the present disclosure may operate, a web design company may design many different types of websites for many different types of clients (e.g., restaurants, banks, bloggers, etc.). The web design company may have already designed and implemented a variety of synthetic monitoring solutions for their clients, but implementing new synthetic monitoring solutions might take an inconvenient amount of time. The web design company may train a first machine learning model based on information about existing synthetic monitoring solutions, in effect training the first machine learning model to learn what portion(s) of websites should be monitored. The web design company may also train a second machine learning model based on the code of synthetic monitoring scripts developed by the company, in effect training the second machine learning model to generate synthetic monitoring scripts based on what those scripts are designed to monitor. Then, after designing a new website for a new client, the web design company may provide a sitemap of the new website to the trained first machine learning model. In response, the trained first machine learning model may output one or more indications of where synthetic monitoring should (and/or should not) be implemented. That output may be provided to the trained second machine learning model, which might output one or more scripts to be executed to monitor the portions of the first website indicated by the output of the first machine learning model. The web design company may then cause a web browser in a virtual machine to execute those scripts. In sum, what would have ordinarily been a laborious process for the web design company (e.g., forcing a developer to manually review the website and hand-program scripts for monitoring that website) might be automated through the use of multiple machine learning models. Of course, as will be described in further detail below, this process need not completely abstract away the humans of the web design company: based on how staff of the web design company implement the scripts output by the trained second machine learning model (e.g., based on whether they delete one, suggesting that either or both of the first machine learning model or the second machine learning model were incorrect), the first machine learning model and/or the second machine learning model may be re-trained.

Aspects described herein improve the functioning of computers by improving the process of computer-implemented synthetic monitoring of network resources. More particularly, the present disclosure uses a unique implementation of machine learning model(s) to learn when and how to strategically monitor network resources (e.g., websites) based on how other network resources have been synthetically monitored in the past. This approach could not be performed by a human being (in no small part due to the involvement of machine learning, which cannot be implemented in a human mind), and in fact is significantly more efficient than alternative approaches using a human being (e.g., forcing a developer to manually program synthetic monitoring scripts for every new network resource).

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., key board, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein.

Various aspects discussed herein may be embodied as a method, a computing device, a data processing system, or a computer program product.

Figure 2:
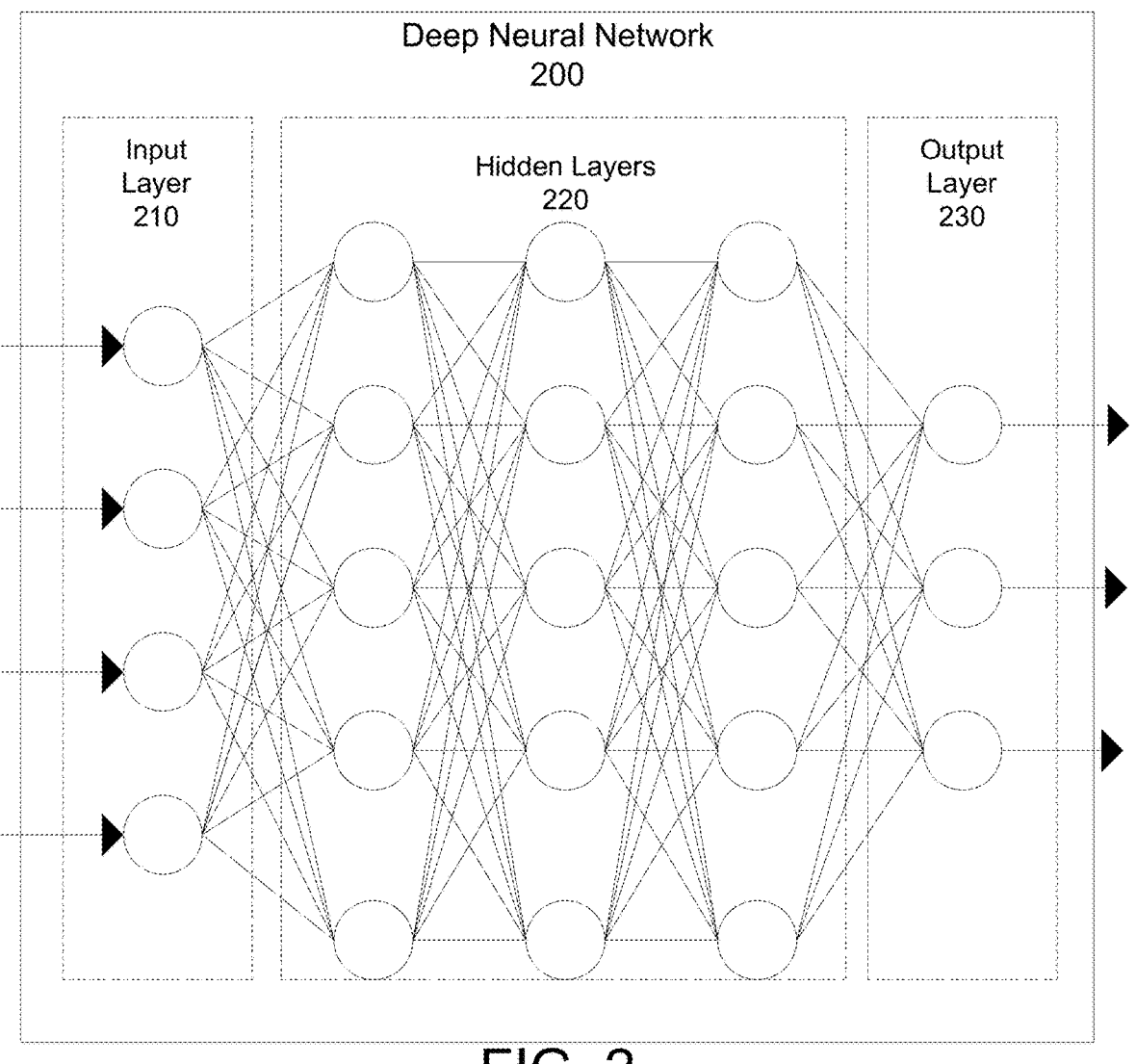
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
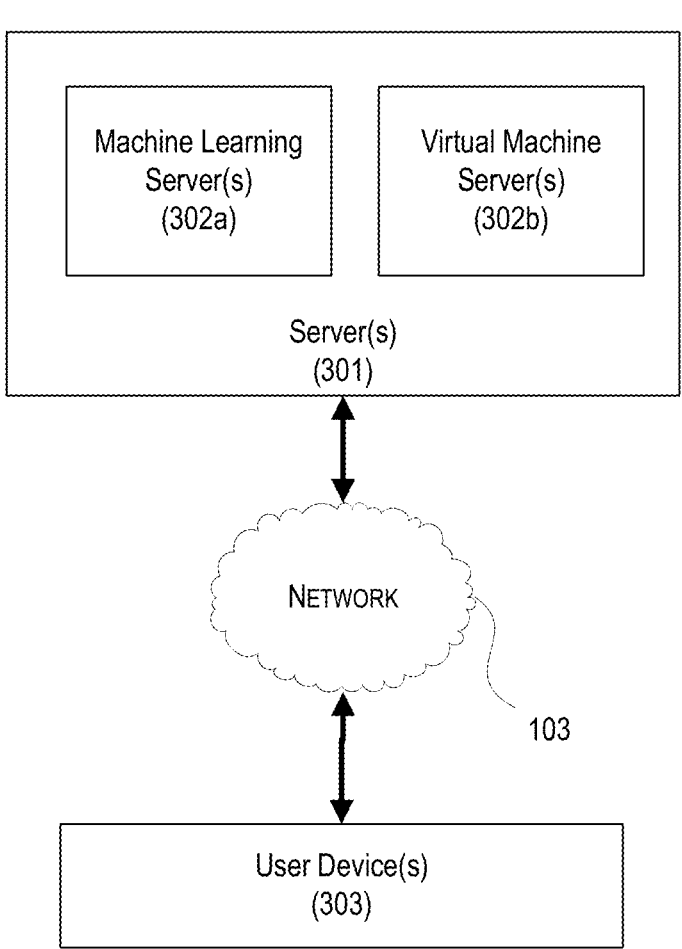
FIG. 3 depicts a system comprising servers (including machine learning servers and virtual machine servers) and user devices.

FIG. 3 depicts a system 300 comprising one or more servers 301 (that include one or more machine learning servers 302a and one or more virtual machine servers 302b) communicatively coupled, via the network 103, to one or more user devices 303. The one or more servers 301 and/or the one or more user devices 303 may comprise computing devices, such as computing devices that comprise one or more processors and memory storing instructions that, when executed on the one or more processors, cause the performance of one or more steps. The one or more servers 301 and/or the one or more user devices 303 may comprise any of the devices depicted with respect to FIG. 1, such as one or more of the computing devices 101, 105, 107, and/or 109.

The servers 301 may comprise one or more computing devices configured to, for example, execute machine learning models (such as by executing the machine learning software 127), to train those machine learning models, to provide input to and receive output from those machine learning models, to generate sitemaps of websites by crawling those websites, to receive and/or transmit data via the network 103, and the like. For example, at least one of the one or more servers 301 may be configured to generate a sitemap of a website by crawling the website using one or more web crawling techniques, then provide that sitemap to a trained machine learning model.

The one or more machine learning servers 302a may be configured to manage machine learning. For instance, the one or more machine learning servers 302a may be configured to train machine learning models, provide input to those trained machine learning models, and/or receive output from those trained machine learning models. This may involve storing data and/or managing (e.g., executing) applications associated with the deep neural network architecture 200. The one or more machine learning servers 302a may be configured to train a machine learning model by causing one or more nodes of an artificial neural network to be weighted based on training data. The one or more machine learning servers 302a may be configured to provide input to that trained machine learning model by, for example, providing input to an input node of the artificial neural network. The one or more machine learning servers 302a may be configured to receive output from that trained machine learning model by, for example, receiving data from an output node of the artificial neural network.

The one or more virtual machine servers 302b may be configured to manage virtual machines. For example, the one or more virtual machine servers 302b may be configured to cause one or more virtual machines (e.g., at least one of the one or more virtual machine servers 302b) to execute, in a web browser application executing in a virtual desktop, one or more scripts. As part of this process, the one or more virtual machine servers 302b may manage a hypervisor or similar application that permits the creation, destruction, and/or overall management of one or more virtual machines (e.g., virtual desktops). The one or more virtual machine servers 302b may manage a variety of different virtual machines. For example, one virtual machine executing on the one or more virtual machine servers 302b may be configured to run a legacy operating system at a low resolution, whereas another virtual machine executing on the one or more virtual machine servers 302b may be configured to run a modern operating system at a relatively greater resolution. As another example, one virtual machine executing on the one or more virtual machine servers 302b may be configured to run one type of web browser application, whereas another virtual machine executing on the one or more virtual machine servers 302b may be configured to run a different type of web browser application. This variety may be advantageous, as it may allow for a wider variety of synthetic monitoring of network resources. For example, by maintaining a variety of different virtual machines, it may be possible to test whether network resources are accessible via both modern and legacy operating systems.

Though the one or more machine learning servers 302a and the virtual machine servers 302b are shown as separate, these servers may execute on one or more of the same servers of the one or more servers 301. For example, the same server that trains a machine learning model may additionally manage one or more virtual desktops. In this manner, the one or more servers 301 may be configured in a wide variety of ways to suit the needs of different organizations and/or users.

The one or more user devices 303 may comprise laptops, desktops, smartphones, or similar computing devices. The one or more user devices 303 may be configured to display user interfaces and receive user input via those user interfaces. For example, the one or more user devices 303 may be configured to allow a user to provide, via a user interface, indication of whether output from one or more machine learning models is correct or incorrect. For instance, the one or more user devices 303 may allow users to delete scripts output from a trained second machine learning model. In such a circumstance, the trained second machine learning model may be re-trained based on the deletion, as the deletion may indicate that the trained second machine learning model's output was incorrect. As another example, the one or more user devices 303 may allow users to select, from output from a trained first machine learning model, one or more portions of a website to synthetically monitor. Based on this input, the trained first machine learning model may be re-trained, as the user's selections may indicate that all or portions of the output of the trained first machine learning model are incorrect. The one or more user devices 303 may also be used to access network resources, such as websites.

Figure 4:
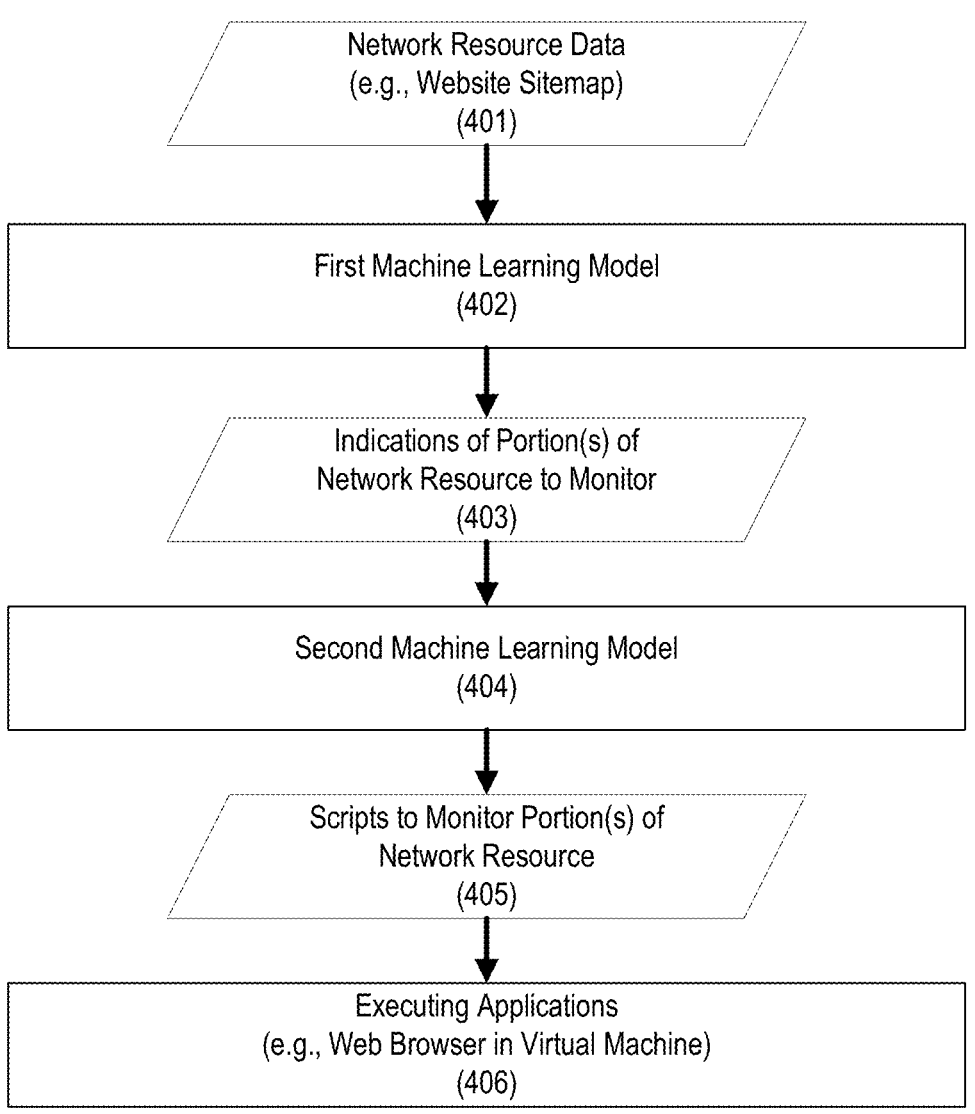
FIG. 4 depicts how network resource data might be ultimately processed, via machine learning models, into an executing synthetic monitoring script.

FIG. 4 depicts how network resource data might be provided to a first machine learning model, then how output from that first machine learning model might be provided to a second machine learning model, and how output from the second machine learning model might be used to ultimately execute scripts to monitor portions of network resources. The process depicted in FIG. 4 might be performed via some or all of the devices depicted in FIG. 4, such as the one or more servers 301 and/or the one or more user devices 303.

Element 401 depicts network resource data. Network resource data may comprise a URL of a website and/or a sitemap of that website. In the case that the network resource data comprises a URL, the network resource data may be processed to generate a sitemap of a corresponding website. For example, in response to receiving a URL, an application executing on the one or more servers 301 may be configured to perform web crawling techniques to determine a sitemap corresponding to the URL. Such web crawling may be performed by iteratively accessing pages linked from a first web page, then iteratively accessing pages linked from those pages, and so forth. The network resource data may thus represent one or more portions of a network resource, such as one or more pages of a website.

Element 402 represents a first machine learning model, and element 403 indicates output from the first machine learning model and comprises indications of portions of a network resource to monitor. The first machine learning model may receive the network resource data represented by element 401 and generate an indication of portions of a network resource to monitor. For example, in response to receipt of a sitemap, the first machine learning model may have been trained to output indications of one or more portions of that sitemap that should be synthetically monitored (as indicated by element 403). The first machine learning model may have been trained to provide such output based on synthetic monitoring information provided with respect to a plurality of different websites. For instance, based on synthetic monitoring information generally indicating that most website administrators synthetically monitor their login pages, the first machine learning model may output a recommendation that a login page (listed on the sitemap input to the first machine learning model) be synthetically monitored.

Element 404 represents a second machine learning model, and element 405 represents output from the second machine learning model that comprises synthetic monitoring scripts configured to monitor portions of a network resource. The second machine learning model may receive the output from the first machine learning model (that is, the indications of the portions of network resources to monitor, as represented by element 403) and may provide, in response to that input, one or more synthetic monitoring scripts that, when executed, monitor corresponding portions of the network resource. As such, while the first machine learning model provides output indicating what portions of a network resource (e.g., what pages of a website) should be monitored, the second machine learning model takes that output and provides its own output that includes code for scripts that can be executed to monitor those portions of the network resource.

Element 406 represents executing applications which may be configured to execute the scripts output from the second machine learning model. The scripts output via the second machine learning model may be executed by, for example, one or more applications executing in one or more virtual machines, such as might be managed by the one or more virtual machine servers 302*b*. For example, the scripts output by the second machine learning model might cause monitoring of a login page, and the scripts might be provided to different web browsers executing in different virtual machines such that the scripts might be executed by different web browsers in different operating systems. In this manner, the synthetic monitoring scripts might be provided to not merely a single application, but instead a wide variety of different applications, facilitating the ability to monitor network resources using a wide variety of different computing configurations. This is a particularly useful strategy with respect to websites, as a webpage might be accessible via one web browser but not another.

Figure 5:
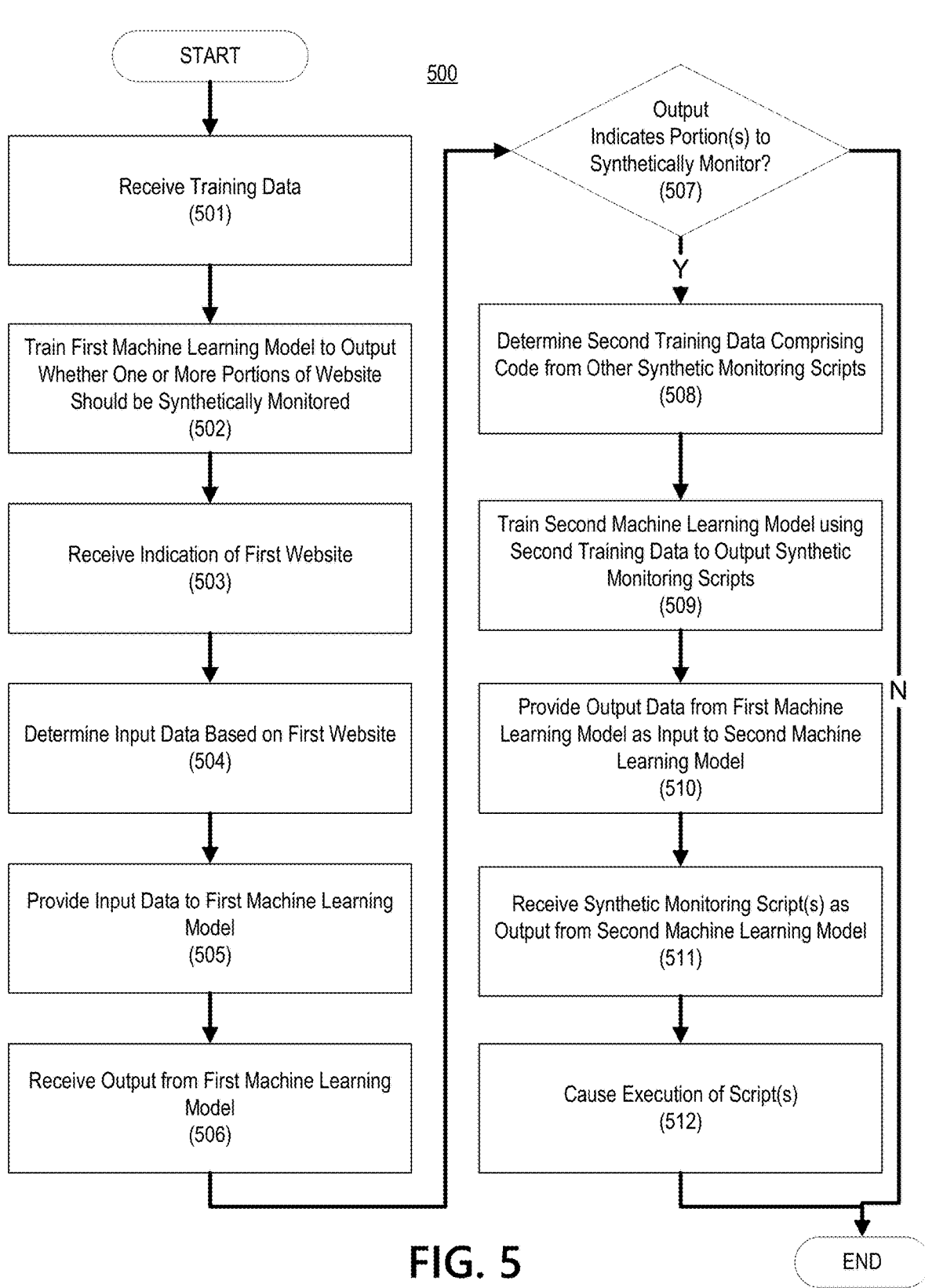
FIG. 5 depicts a flow chart comprising steps which may be performed for improving synthetic monitoring.

FIG. 5 depicts a flow chart depicting a method 500 comprising steps which may be performed for improving synthetic monitoring. A computing device may comprise one or more processors and memory storing instructions that, when executed by the one or more processors, cause performance of one or more of the steps of FIG. 5. One or more non-transitory computer-readable media may store instructions that, when executed by one or more processors of a computing device, cause the computing device to perform one or more of the steps of FIG. 5. Additionally and/or alternatively, one or more of the devices depicted in FIG. 3, such as the one or more servers 301 and/or the one or more user devices 303, may be configured to perform one or more of the steps of FIG. 5. Moreover, all or portions of the steps of FIG. 5 may be the same or similar as the elements and concepts depicted with respect to FIG. 4. For simplicity, the steps below will be described as being performed by a single computing device: however, this is merely for simplicity, and any of the below-referenced steps may be performed by a wide variety of computing devices, including multiple computing devices.

In step 501, a computing device may receive training data. The training data may be any information which can be used to train a first machine learning model to learn which portion(s) of a network resource should be synthetically monitored. For example, the computing device may receive training data comprising sitemap information indicating different portions of a plurality of different websites and/or monitoring information indicating whether, for each of the different portions of the plurality of different websites, one or more synthetic monitoring scripts are executed. In this manner, the training data may be tagged or otherwise configured to indicate where, for a plurality of different network resources, where synthetic monitoring is already implemented. Those synthetic monitoring scripts may comprise code that, when executed by a web browser application, cause automatic monitoring of at least a portion of a website. As such, the existence of a synthetic monitoring script may indicate that an administrator or similar individual finds value in synthetically monitoring some portion of a website. This can be valuable training information, as it implicitly indicates which portions of a network resource are potentially worth monitoring (and, in some instances, which portions of a network resource might not be worth monitoring).

Receiving the training data may comprise determining a plurality of websites that are similar to the network resource for which synthetic monitoring scripts will be generated. Synthetic monitoring strategies might differ from network resource to network resource. For example, an organization might monitor a forum website in a different manner than they would synthetically monitor a blog website. In turn, it may be desirable to train the machine learning model to specifically learn how synthetic monitoring is performed for certain types of network resources (e.g., for certain types of websites). For example, as part of receiving the training data, the computing device may determine a website type of the first website and filter the training data based on the type of the first website. In this manner, the machine learning model trained based on this training data would be specific to the type of website in question, improving its accuracy for that website type. In turn, a plurality of different machine learning models might be maintained, with each being trained based on a different type of network resource.

In step 502, the computing device may train a first machine learning model to output whether one or more portions of a network resource should be synthetically monitored. For example, the computing device may train, based on the training data, a first machine learning model comprising a plurality of nodes to output whether one or more portions of an input website should be monitored using synthetic monitoring. As part of this training process, the computing device may modify one or more weights of one or more nodes of an artificial neural network based on the training data.

The trained first machine learning model may be periodically trained and re-trained. As such, the trained first machine learning model might not be static, but instead might evolve to learn over time and thereby become better at outputting whether one or more portions of a network resource should be synthetically monitored. For example, the computing device may, based on determining that a user deleted the first synthetic monitoring script, re-train the trained first machine learning model. In this manner, the trained first machine learning model may infer that its recommendation to monitor a corresponding portion of a network resource was incorrect, and may re-weight connections of its nodes accordingly. As another example, a user may provide, via a user interface, user input indicating whether one or more parts of the output of the trained first machine learning model were correct or incorrect. Based on that user input, the trained first machine learning model may re-weight connections of its nodes accordingly.

In step 503, the computing device may receive an indication of a first website. The indication may comprise a URL or other similar information about the first website. While websites are discussed herein by way of simplicity, the process described herein may be applicable to a wide variety of network resources. For example, virtually all aspects described herein could equally apply to network resources such as shared drives.

In step 504, the computing device may determine input data based on the first website. The input data may comprise any information that provides information about one or more portions of the first website (or, in the case of other network resources, one or more portions of those network resources). For example, the computing device may determine input data comprising a sitemap (or other similar representation of a plurality of portions) of the first website. Such a sitemap may provide information indicating one or more portions of the first website, such as a listing of pages on the first website. As part of determining the input data, the computing device may determine a sitemap of the first website. For example, the computing device may cause execution of a web crawler script that generates the sitemap of the first website. The web crawler may be configured to iteratively step through aspects of a network resource and determine one or more portions of the network resource. For example, a web crawler may be configured to systematically index a website by accessing hyperlinks on the website and developing, based on those hyperlinks and accessing pages linked by those hyperlinks, a tree-like structure of the website. The sitemap may be determined using other strategies as well. For example, some network resources may maintain their own sitemaps, and these sitemaps may be downloaded and used as desired. As another example, a third party may maintain index information regarding a network resource, and that information may be downloaded and used as input data.

In step 505, the computing device may provide input data to the trained first machine learning model. For example, the computing device may provide, as input to the trained first machine learning model, the input data. Providing the input data may comprise providing, to one or more input nodes of the trained first machine learning model, a sitemap or other similar information that indicates one or more portions of a network resource.

In step 506, the computing device may receive output from the first machine learning model. For example, the computing device may receive, as output from the trained first machine learning model, output data comprising an indication of one or more portions of the first website. The output data may thereby indicate where synthetic monitoring is recommended with respect to the first website. Such output data may be received via one or more output nodes of an artificial neural network that implements the trained first machine learning model.

The output received in step 506 need not merely comprise a list of where synthetic monitoring should be performed with respect to a network resource. For instance, the output data may indicate at least one portion of the first website where synthetic monitoring should not be performed. As another example, the output data may indicate a degree of confidence that synthetic monitoring should be performed with respect to a particular portion of a network resource.

In step 507, the computing device may determine whether the output from the first machine learning model indicates one or more portions of the website to monitor. In some instances, the output may indicate that no portions of a network resource should be monitored. In such a circumstance, then subsequent steps might not be necessary. That said, the output may indicate that some portions of a network resource should be monitored (and, in some cases, with various degrees of confidence with respect to such a recommendation). If the output indicates one or more portions of the website to monitor, the method 500 proceeds to step 508. Otherwise, the method 500 ends.

In step 508, the computing device may determine second training data. The second training data may comprise code from other synthetic monitoring scripts and/or any other form of data which is capable of training a second machine learning model to, in response to indications of where synthetic monitoring should be performed, generate code for such synthetic monitoring. For example, the computing device may determine second training data comprising code from one or more synthetic monitoring scripts executed with respect to one or more of the different portions of the plurality of different websites. Stated differently, the second training data might comprise information about how synthetic monitoring was implemented in code in the past (and by manual programming), and such information may be usable to train a second machine learning model to generate code for subsequent synthetic monitoring.

Determining the second training data may comprise retrieving information about code from the other synthetic monitoring scripts. Synthetic monitoring may be performed via a variety of different services. For example, various different companies may each provide synthetic monitoring services by providing, for a fee, access to virtual machines that are capable of running scripts in web browsers and thereby checking the functionality of network resources. As such, as part of determining the second training data, a variety of different sets of code from a variety of different synthetic monitoring services may be gathered. For example, the computing device may retrieve, from a plurality of different synthetic monitoring services, a plurality of different scripts executed with respect to the one or more of the different portions of the plurality of different websites.

The second training data may be filtered based on website type. As also indicated above with respect to the first training data, it may be advantageous to train machine learning models to provide output for specific types of network resources, as the particular portions of those resources that require synthetic monitoring (and the manner in which synthetic monitoring should be implemented in code) may vary. As such, it may be advantageous to ensure that the second training data comprises code from network resources of a particular type that corresponds to the type of resource indicated in step 503. Along those lines, the computing device may filter, based on a website type of the first website, the plurality of different scripts. For example, the plurality of different scripts may be filtered to only contain scripts from gaming websites responsive to a determination that the website indicated in step 503 is a gaming website.

In step 509, the computing device may train a second machine learning model using the second training data to output synthetic monitoring scripts. For example, the computing device may train, based on the second training data, a second machine learning model comprising a second plurality of nodes to output synthetic monitoring scripts in response to input indicating one or more portions of a website. Such training may cause weighting of connections between one or more second nodes of a second artificial neural network.

In step 510, the computing device may provide, as input to the trained second machine learning model, input comprising the output data from the trained first machine learning model. For example, and as part of ultimately determining, based on the one or more portions of the first website, a first synthetic monitoring script for monitoring at least one of the one or more portions of the first website, the computing device may provide, as input to the trained first machine learning model, the output data. The input may be provided to one or more input nodes of an artificial neural network implementing the trained second machine learning model.

Prior to providing the output from the trained first machine learning model to the trained second machine learning model, the output may be processed. The output may be processed to remove indications of portions of a network resource that are associated with a confidence level below a threshold value. For example, the output may indicate a 30% confidence that a terms and conditions page of a website should be monitored, and the threshold value may be 50%, such that the output may be processed to remove the terms and conditions page.

In step 511, the computing device may receive, as output from the trained second machine learning model, one or more synthetic monitoring scripts. As such, the trained second machine learning model may be configured to provide code that, when executed, causes the monitoring of portions of a network resource identified via the output of the trained first machine learning model. For example, the computing device may receive, as output from the trained second machine learning model, second output data comprising an indication of the first synthetic monitoring script. The term code and script is used interchangeably herein, as the output from the trained second machine learning model may be used in a variety of ways. For example, the output may comprise different sets of code which each cause monitoring of different portions of a network resource. As another example, the output may comprise a set of code which is to be executed by web browsers executing in a plurality of different virtual machines, such that the same code may be executed in different computing environments to cause monitoring of the same portion of a network resource.

As part of the process described above in step 510 and/or step 511, a user may be prompted to provide input selecting one or more synthetic monitoring scripts. This may advantageously allow user input to not only improve the synthetic monitoring that results from step 510 and/or step 511, but may also provide an opportunity to re-train and thereby improve either or both the trained first machine learning model and/or the trained second machine learning model. The computing device may provide an interface comprising an indication of the at least one of the one or more portions of the first website and/or a plurality of options that each correspond to a different synthetic monitoring script. For example, the user interface may list a variety of different portions of a website and prompt the user to select, for each portion of the website, a script to execute (if at all). The computing device may then receive, via the user interface, user input indicating a selection of one of the plurality of options that corresponds to the first synthetic monitoring script. Then, based on the user input indicating the selection of the one of the plurality of options, the computing device may re-train the trained first machine learning model.

One advantage of the process described above is that it may allow a user to select from a variety of different scripts output by the trained second machine learning model for the same portion of a network resource. For example, the trained second machine learning model may output two possible scripts for monitoring a login page: one might be more comprehensive but slower-executing, whereas the other might be simpler but faster-executing. The user may be capable of selecting one of these two scripts as part of the process described above in step 510 and/or step 511. This not only ensures that synthetic monitoring is performed in a manner desired by the user, but also provides an opportunity for re-training the first and/or second machine learning models.

Synthetic monitoring scripts, such as the one or more synthetic monitoring scripts received in step 511, may be configured to perform a wide variety of tasks. A synthetic monitoring script may be configured to access one or more URLs. A synthetic monitoring script may additionally and/or alternatively be configured to cause entry of data into a web form. A synthetic monitoring script may additionally and/or alternatively be configured to interact with interactive elements of a network resource, such as clicking a button or moving a mouse. A synthetic monitoring script may additionally and/or alternatively be configured to download content, such as attempting to retrieve data from a network share. A synthetic monitoring script may additionally and/or alternatively be configured to upload content, such as uploading content via a web form. The synthetic monitoring scripts may be implemented via Selenium, JavaScript, Python, or the like.

In step 512, the computing device may cause execution of the received synthetic monitoring script(s). For example, the computing device may cause, based on the output data, execution of the first synthetic monitoring script. Causing execution of the received synthetic monitoring script(s) may comprise causing one or more different computing devices and/or virtual machines to execute the script. This may comprise sending instructions to one or more virtual machines. For example, the computing device may send, to a virtual machine executing on a server, the first synthetic monitoring script, wherein a web browser application executing in the virtual machine is configured to execute the first synthetic monitoring script. In some cases, the scripts might be executed by computing devices without use of virtual machines. For example, some synthetic monitoring services use real computing devices (e.g., a series of authentic laptops, desktops, and the like, often running older software to provide backwards compatibility test functionality) to perform synthetic monitoring, such that synthetic monitoring script(s) may be sent to such devices. Indeed, virtually any computing device may be configured to execute the script in accordance with step 512.

The process depicted in FIG. 5 may be periodically performed with respect to the same network resource. It may be desirable to periodically re-run FIG. 5 in view of changes to network resources (e.g., the addition of various pages to a website), changes to machine learning models (e.g., the re-training of those models over time), and the like. In turn, responsive to detecting a change in a network resource, and/or responsive to re-training of one or more of the machine learning models described herein, FIG. 6 depicts a synthetic monitoring script 600 that is configured to test an input form of a web page. The synthetic monitoring script 600 is illustrative and provided in pseudo-code, and provides an example of the sort of code that might be output as part of step 511 of FIG. 5. Specifically, the synthetic monitoring script 600 may be configured to cause a web browser application to access a page ("ACCESS loginpage.html"), go to a particular portion of that website ("GO TO input name='username'"), and then enter data into that portion of the website ("ENTER testingusername123"). The synthetic monitoring script 600 is shown as being configured to repeat this process with a password field ("GO TO input type='password'" and "ENTER testingpassword123"). The synthetic monitoring script 600 is shown as then prompting the web browser application to click a button ("CLICK input type='button'") and confirm whether the page loads correctly ("ALERT IF NOT HTTP 200").

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors; and
memory storing instructions that, when executed by the one or more processors, cause the computing device to:
receive training data comprising:
sitemap information indicating different portions of a plurality of different websites; and
monitoring information indicating whether, for each of the different portions of the plurality of different websites, one or more synthetic monitoring scripts are executed, wherein the one or more synthetic monitoring scripts comprise code that, when executed by a web browser application, cause automatic monitoring of at least a portion of a website:
train, based on the training data, a first machine learning model comprising a plurality of nodes to output whether one or more portions of an input website should be monitored using synthetic monitoring;
receive an indication of a first website;
determine input data comprising a sitemap of the first website;
provide, as input to the trained first machine learning model, the input data:
receive, as output from the trained first machine learning model, output data comprising an indication of one or more portions of the first website:
determine second training data comprising code from one or more synthetic monitoring scripts executed with respect to one or more of the different portions of the plurality of different websites;
train, based on the second training data, a second machine learning model comprising a second plurality of nodes to output synthetic monitoring scripts in response to input indicating one or more portions of a website:
determine, based on the one or more portions of the first website, a first synthetic monitoring script for monitoring at least one of the one or more portions of the first website by:
providing, as input to the trained second machine learning model, the output data; and
receiving, as output from the trained second machine learning model, second output data comprising an indication of the first synthetic monitoring script; and
cause, based on the output data, execution of the first synthetic monitoring script.

2. The computing device of claim 1, wherein the instructions, when executed by the one or more processors, further cause the computing device to determine the second training data by causing the computing device to:
retrieve, from a plurality of different synthetic monitoring services, a plurality of different scripts executed with respect to the one or more of the different portions of the plurality of different websites; and filter, based on a website type of the first website, the plurality of different scripts.

3. The computing device of claim 1, wherein the instructions, when executed by the one or more processors, further cause the computing device to determine the first synthetic monitoring script by causing the computing device to:

provide a user interface comprising:

an indication of the at least one of the one or more portions of the first website; and a plurality of options that each correspond to a different synthetic monitoring script:

receive, via the user interface, user input indicating a selection of one of the plurality of options that corresponds to the first synthetic monitoring script; and re-train, based on the user input indicating the selection of the one of the plurality of options, the trained first machine learning model.

4. The computing device of claim 1, wherein the instructions, when executed by the one or more processors, further cause the computing device to:

based on determining that a user deleted the first synthetic monitoring script, re-train the trained first machine learning model.

5. The computing device of claim 1, wherein the instructions, when executed by the one or more processors, cause the computing device to cause execution of the first synthetic monitoring script by causing the computing device to:

send, to a virtual machine executing on a server, the first synthetic monitoring script, wherein a web browser application executing in the virtual machine is configured to execute the first synthetic monitoring script.

6. The computing device of claim 1, wherein the instructions, when executed by the one or more processors, cause the computing device to receive the training data by causing the computing device to:

determine a website type of the first website; and filter the training data based on the type of the first website.

7. The computing device of claim 1, wherein the instructions, when executed by the one or more processors, cause the computing device to determine the input data comprising the sitemap of the first website by causing the computing device to:

cause execution of a web crawler script that generates the sitemap of the first website.

8. The computing device of claim 1, wherein the first synthetic monitoring script comprises code that, when executed by a web browser application, causes one or more of:

access to one or more Uniform Resource Locators (URLs); or entry of data into a web form.

9. The computing device of claim 1, wherein the output data indicates at least one portion of the first website where synthetic monitoring should not be performed.

10. A method comprising:

receiving, by a computing device, training data comprising:

sitemap information indicating different portions of a plurality of different websites; and monitoring information indicating whether, for each of the different portions of the plurality of different websites, one or more synthetic monitoring scripts are executed, wherein the one or more synthetic monitoring scripts comprise code that, when executed by a web browser application, cause automatic monitoring of at least a portion of a website:

training, by the computing device and based on the training data, a first machine learning model comprising a plurality of nodes to output whether one or more portions of an input website should be monitored using synthetic monitoring;

receiving, by the computing device, an indication of a first website;

determining, by the computing device, input data comprising a sitemap of the first website;

providing, by the computing device and as input to the trained first machine learning model, the input data;

receiving, by the computing device and as output from the trained first machine learning model, output data comprising an indication of one or more portions of the first website;

determining, by the computing device and based on the one or more portions of the first website, a first synthetic monitoring script for monitoring at least one of the one or more portions of the first website; and sending, by the computing device and to a virtual machine executing on a server, the first synthetic monitoring script, wherein a web browser application executing in the virtual machine is configured to execute the first synthetic monitoring script.

11. The method of claim 10, further comprising:

determining second training data comprising code from one or more synthetic monitoring scripts executed with respect to one or more of the different portions of the plurality of different websites; and training, based on the second training data, a second machine learning model comprising a second plurality of nodes to output synthetic monitoring scripts in response to input indicating one or more portions of a website, wherein determining the first synthetic monitoring script comprises:

providing, as input to the trained second machine learning model, the output data; and receiving, as output from the trained second machine learning model, second output data comprising an indication of the first synthetic monitoring script.

12. The method of claim 10, wherein determining the first synthetic monitoring script comprises:

providing a user interface comprising:

an indication of the at least one of the one or more portions of the first website; and a plurality of options that each correspond to a different synthetic monitoring script:

receiving, via the user interface, user input indicating a selection of one of the plurality of options that corresponds to the first synthetic monitoring script; and re-training, based on the user input indicating the selection of the one of the plurality of options, the trained first machine learning model.

13. The method of claim 10, further comprising:

based on determining that a user deleted the first synthetic monitoring script, re-training the trained first machine learning model.

14. The method of claim 10, wherein receiving the training data comprises:

determining a website type of the first website; and filtering the training data based on the type of the first website.

15. The method of claim 10, wherein determining the input data comprising the sitemap of the first website comprises:

causing execution of a web crawler script that generates the sitemap of the first website.

16. One or more non-transitory computer-readable media storing instructions that, when executed by one or more processors of a computing device, cause the computing device to:

receive training data comprising:

sitemap information indicating different portions of a plurality of different websites; and monitoring information indicating whether, for each of the different portions of the plurality of different websites, one or more synthetic monitoring scripts are executed, wherein the one or more synthetic monitoring scripts comprise code that, when executed by a web browser application, cause automatic monitoring of at least a portion of a website;

train, based on the training data, a first machine learning model comprising a plurality of nodes to output whether one or more portions of an input website should be monitored using synthetic monitoring;

receive an indication of a first website;

determine input data comprising a sitemap of the first website;

provide, as input to the trained first machine learning model, the input data;

receive, as output from the trained first machine learning model, output data comprising an indication of one or more portions of the first website:

determine, based on the one or more portions of the first website, a first synthetic monitoring script for monitoring at least one of the one or more portions of the first website; and cause, based on the output data, execution of the first synthetic monitoring script.

17. The one or more non-transitory computer-readable media of claim 16, wherein the instructions, when executed by the one or more processors, further cause the computing device to:

determine second training data comprising code from one or more synthetic monitoring scripts executed with respect to one or more of the different portions of the plurality of different websites; and train, based on the second training data, a second machine learning model comprising a second plurality of nodes to output synthetic monitoring scripts in response to input indicating one or more portions of a website, wherein the instructions, when executed by the one or more processors, cause the computing device to determine the first synthetic monitoring script by causing the computing device to:

provide, as input to the trained second machine learning model, the output data; and receive, as output from the trained second machine learning model, second output data comprising an indication of the first synthetic monitoring script.

18. The one or more non-transitory computer-readable media of claim 16, wherein the instructions, when executed by the one or more processors, further cause the computing device to determine the first synthetic monitoring script by causing the computing device to:

provide a user interface comprising:

an indication of the at least one of the one or more portions of the first website; and a plurality of options that each correspond to a different synthetic monitoring script;

receive, via the user interface, user input indicating a selection of one of the plurality of options that corresponds to the first synthetic monitoring script; and re-train, based on the user input indicating the selection of the one of the plurality of options, the trained first machine learning model.

19. The one or more non-transitory computer-readable media of claim 16, wherein the instructions, when executed by the one or more processors, further cause the computing device to:

based on determining that a user deleted the first synthetic monitoring script, re-train the trained first machine learning model.

20. The one or more non-transitory computer-readable media of claim 16, wherein the instructions, when executed by the one or more processors, cause the computing device to cause execution of the first synthetic monitoring script by causing the computing device to:

send, to a virtual machine executing on a server, the first synthetic monitoring script, wherein a web browser application executing in the virtual machine is configured to execute the first synthetic monitoring script.

* * * * *